United States Patent
Zou et al.

(10) Patent No.: US 11,742,572 B2
(45) Date of Patent: *Aug. 29, 2023

(54) ANTENNA TRANSMISSION DEVICE

(71) Applicants: PROSE TECHNOLOGIES (SUZHOU) CO., LTD., Suzhou (CN); PROSE TECHNOLOGIES LLC, Mount Olive, NJ (US)

(72) Inventors: Zhonghao Zou, Suzhou (CN); Yongzhong Li, Suzhou (CN)

(73) Assignees: PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,376

(22) Filed: Mar. 7, 2022

(65) Prior Publication Data
US 2022/0209405 A1 Jun. 30, 2022

Related U.S. Application Data

(63) Continuation of application No. 17/383,125, filed on Jul. 22, 2021, now Pat. No. 11,355,839.

(30) Foreign Application Priority Data

Dec. 29, 2020 (CN) .......................... 202023234738.4

(51) Int. Cl.
*H01Q 3/02* (2006.01)
*H01Q 3/32* (2006.01)
*H01Q 1/24* (2006.01)

(52) U.S. Cl.
CPC ............... *H01Q 3/02* (2013.01); *H01Q 1/246* (2013.01)

(58) Field of Classification Search
CPC .. H01Q 3/32; H01Q 3/02; H01Q 1/24; H01Q 1/246; H01Q 1/32; F16H 19/04; F16H 1/20; F16H 1/203; F16H 25/20; F16H 1/16; F16H 37/02; F16H 37/08; F16H 37/083; B60K 6/44; B60K 6/442; B60K 6/445; B60K 6/387; B60K 6/36; B60K 7/00; B60K 17/356
See application file for complete search history.

(56) References Cited

U.S. PATENT DOCUMENTS

| | | | |
|---|---|---|---|
| 2,930,255 A | 3/1960 | Bryson | |
| 4,800,768 A | 1/1989 | Kazuta | |
| 6,538,619 B2 | 3/2003 | Heinz et al. | |
| 6,683,582 B1 | 1/2004 | Love | |
| 11,355,839 B1* | 6/2022 | Zou .......................... | H01Q 3/32 |
| 2007/0155574 A1 | 7/2007 | Tseng | |
| 2010/0053008 A1 | 3/2010 | Le et al. | |
| 2017/0295426 A1 | 10/2017 | Park et al. | |

FOREIGN PATENT DOCUMENTS

| | | | | |
|---|---|---|---|---|
| CN | 109149076 A | * | 1/2019 | |
| CN | 111064005 A | * | 4/2020 | ............ H01Q 1/246 |
| CN | 115173027 A | * | 10/2022 | |

\* cited by examiner

*Primary Examiner* — Tho G Phan
(74) *Attorney, Agent, or Firm* — Anova Law Group, PLLC

(57) ABSTRACT

An antenna transmission device includes a shell, an output unit, and an input unit. The output unit is slidingly arranged at the shell and includes a rack. The input unit is at least partially arranged in the shell, meshes with the rack of the output unit, and is configured to drive the output unit to move linearly.

9 Claims, 5 Drawing Sheets

ANTENNA TRANSMISSION DEVICE

CROSS-REFERENCES TO RELATED APPLICATIONS

This application is a continuation application of U.S. patent application Ser. No. 17/383,125, filed on Jul. 22, 2021, which claims priority to Chinese Application No. 202023234738.4, filed on Dec. 29, 2020, the entire contents of both of which are incorporated herein by reference.

TECHNICAL FIELD

The present disclosure generally relates to the field of base station antenna and, more particularly, to an antenna transmission device.

BACKGROUND

In engineering systems of wireless communication, broadcasting, radar, and navigation of aviation and sailing, a radio wave is needed to transmit information to complete the operation of the whole system. An antenna is a basic device, which is configured to transmit and receive the radio wave, in these systems.

As mobile communication technology is rapidly developed, a base station antenna is broadly applied. In an engineering design of a communication network, the base station antenna is appropriately selected according to actual situations of network coverage requirements, traffic distribution, anti-interference requirements, and network service quality.

The base station antenna mainly includes a cover body, and members of a transmission device, a phase shifter, a radiating unit, and a feeder network that are arranged in the cover body. The existing transmission device includes a screw and a nut as a core to form a spiral transmission and is supplemented by a stop piece, a sliding rail, a fixed frame, etc. Thus, the existing transmission device needs a variety of components and has a high cost. Meanwhile, the transmission device having the screw and nut as the core takes a large space (e.g., when a required transmission distance is 60 mm, the whole transmission device is greater than 60 mm), which is not beneficial for antenna arrangement. A sliding rail chute of the nut poorly cooperates with the nut, making it difficult to precisely control the nut. In addition, a snap or another form of connection member in an output member of the transmission device has a poor assembly precision impacted by a contact length.

SUMMARY

Embodiments of the present disclosure provide an antenna transmission device including a shell, an output unit, and an input unit. The output unit is slidingly arranged at the shell and includes a rack. The input unit is at least partially arranged in the shell, meshes with the rack of the output unit, and is configured to drive the output unit to move linearly.

Figure 1:
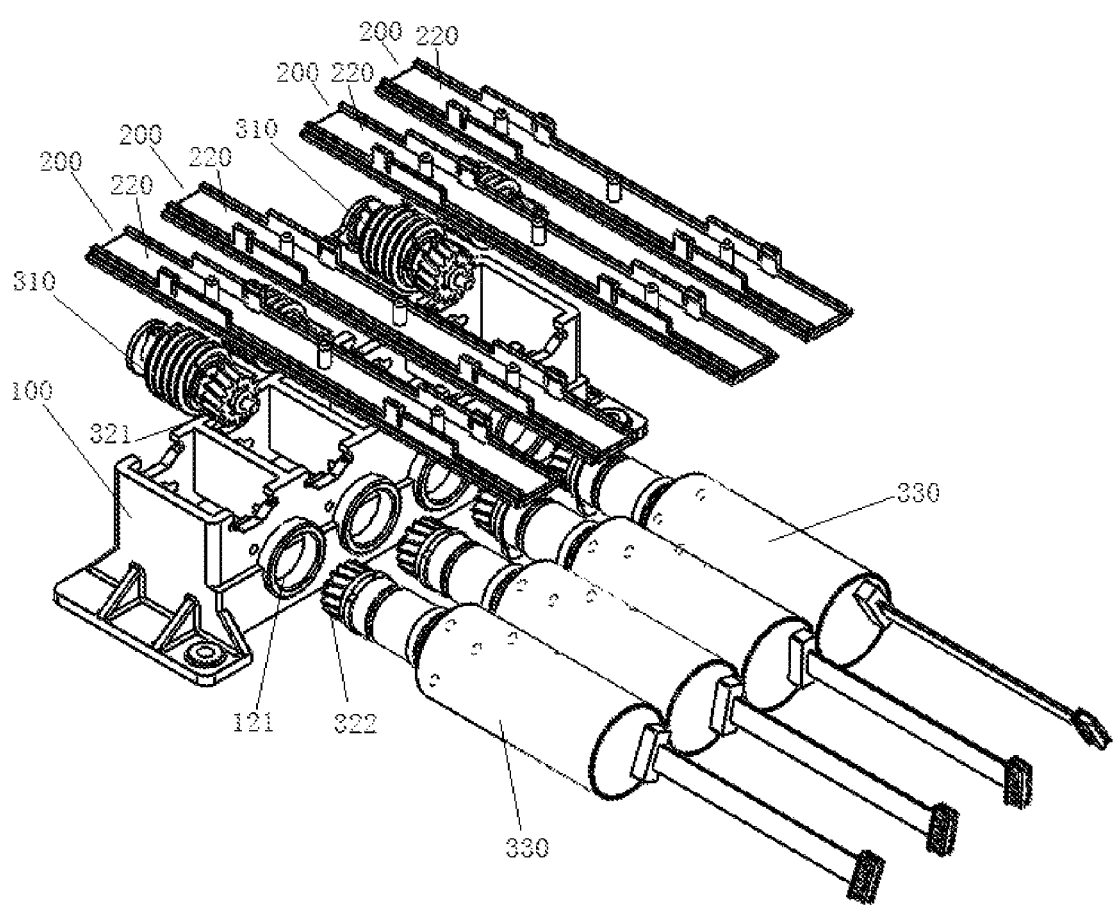
FIG. 1 is a schematic overall exploded diagram of a transmission device for an antenna according to some embodiments of the present disclosure.

In the present disclosure, the other features, characteristics, advantages, and benefits will become apparent through the detailed description in conjunction with the drawings.

DETAILED DESCRIPTION OF THE EMBODIMENTS

The technical solutions of the present disclosure are further described according to following embodiments and in connection with the accompanying drawings. In the specification, same or similar reference numerals indicate same or similar components. The following description of embodiments of the present disclosure with reference to the accompanying drawings is intended to explain the general inventive concept of the present disclosure, and should not be considered as a limitation of the present disclosure.

The terms "including," "containing," and similar terms used in the specification should be understood as open terms, that is, "including/including but not limited to", which means that another content may also be included. The term "based on" is "at least partially based on." The term "one embodiment" means "at least one embodiment". The term "another embodiment" means "at least one additional embodiment", etc.

Embodiments of the present disclosure mainly focus on the following technical problems: how to reduce a space taken by a transmission device, improve transmission control precision, and reduce manufacturing cost.

To solve the above problems, the antenna transmission device of the present disclosure may include a shell, one or more output units, and one or more input units. An input unit may mesh with a rack of a corresponding output unit to drive the output unit to move linearly.

Figure 3:
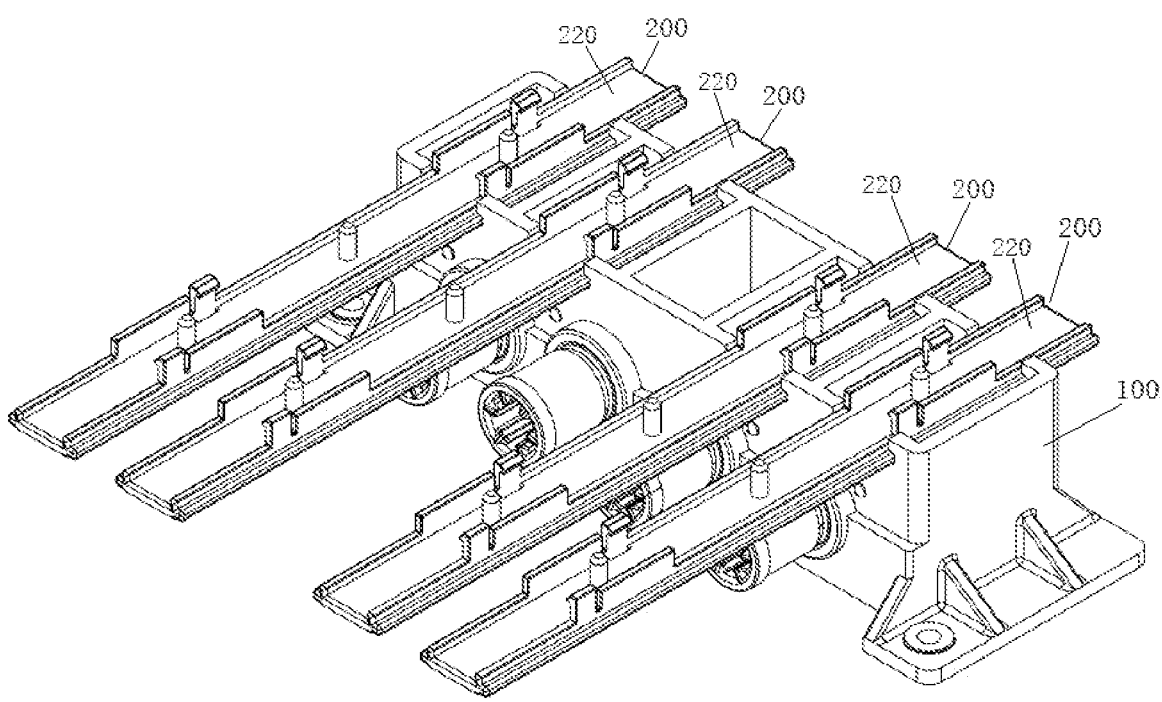
FIG. 3 is a schematic perspective diagram of the antenna transmission device according to some embodiments of the present disclosure.
Figure 4:
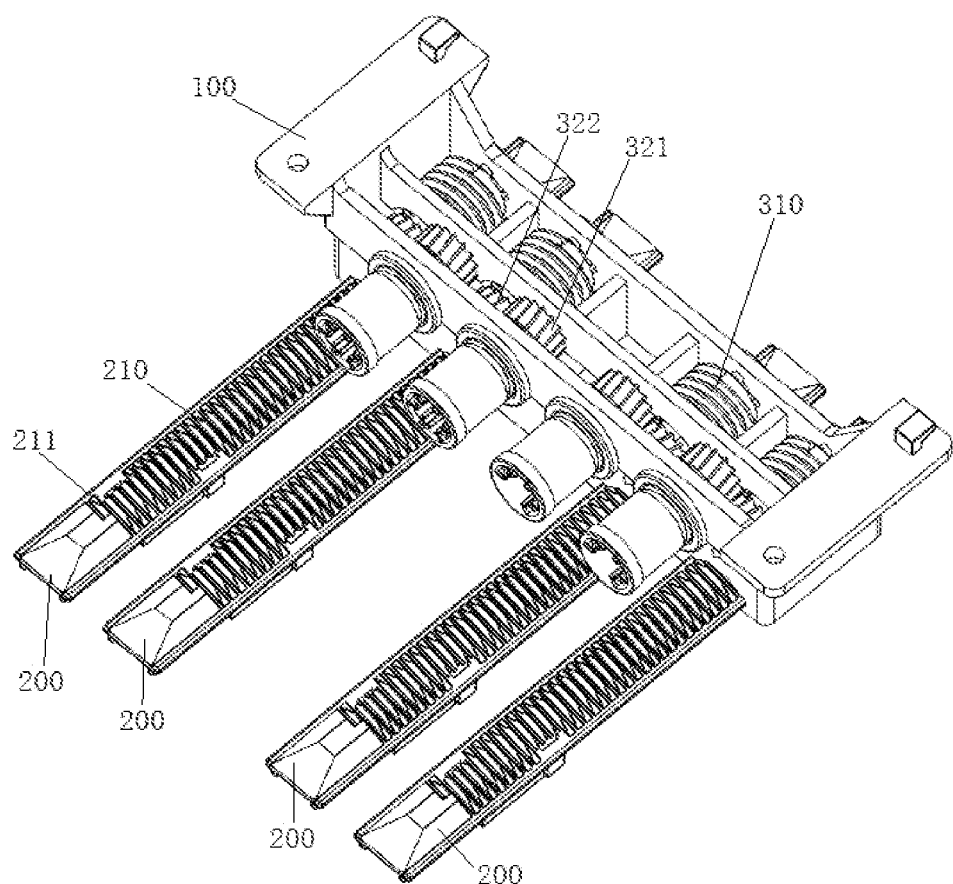
FIG. 4 is another schematic perspective diagram of the antenna transmission device according to some embodiments of the present disclosure.

As shown in FIG. 1, FIG. 3, and FIG. 4, the antenna transmission device of the present disclosure is used to drive the movable part of a phase shifter to move, thereby changing the phase of the signal. The antenna transmission device includes a shell 100, at least one output unit 200, and at least one input unit. The output unit 200 is slidingly arranged at the shell 100 and at least includes a rack 210. The input unit is at least partially arranged in the shell 100. The input unit meshes with the rack 210 of the output unit 200 to drive the output unit 200 to move linearly.

In some embodiments, as shown in FIG. 1, FIG. 3, and FIG. 4, the antenna transmission device includes a plurality of output units 200 and a plurality of input units. Each of the plurality of output units 200 meshes with a corresponding input unit and is controlled by the input unit.

In addition, the output unit 200 further includes an assembly structure 220. The assembly structure 220 is coupled to the rack 210. In practical applications, the assembly structure 220 and the rack 210 may be formed integrally as needed or coupled by a connection member.

As shown in FIG. 1, FIG. 2, FIG. 4, and FIG. 5, the input unit at least includes a fixed rotation transmission member 310, an adaptor assembly 320, and an input motor 330. The fixed rotation transmission member 310 is arranged in the shell 100 and meshes with the rack 210 of the output unit 200. The input motor 330 is arranged outside of the shell 100 and is coupled to the fixed rotation transmission member 310 through the adaptor assembly 320. The input motor 330 is configured to provide driving power to the fixed rotation transmission member 310. The input motor 330 is controlled by a local control unit or remote control unit of the corresponding antenna.

Figure 2:
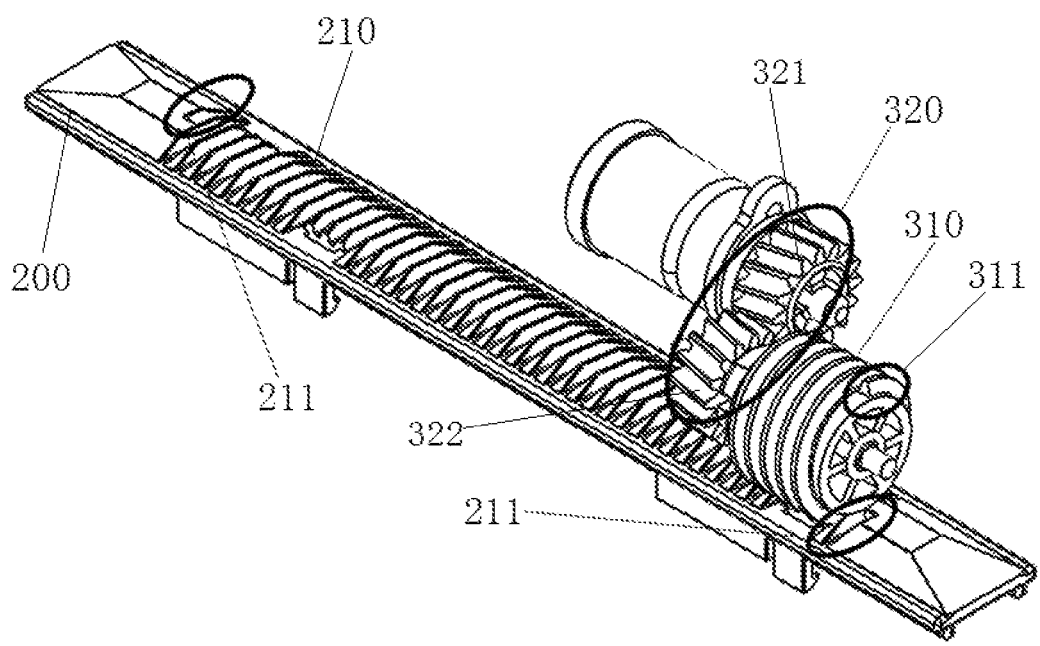
FIG. 2 is a first schematic partial diagram of the antenna transmission device according to some embodiments of the present disclosure.

In some embodiments, the input motor 330 may be coupled to the fixed rotation transmission member 310 in an adaptation manner. For example, the input motor 330 may be coupled to the fixed rotation transmission member 310 by an adaptor assembly. As shown in FIG. 2 and FIG. 4, the adaptor assembly 320 in some embodiments of the present disclosure is arranged in the shell 100, such that the fixed rotation transmission member 310 is coupled to the input motor 330 through the adaptor assembly 320. The adaptor assembly 320 includes a first gear 321 and a second gear 322. The first gear 321 is coupled to an output shaft of the input motor 330. The second gear 322 is coupled to the fixed rotation transmission member 310 and meshes with the first gear 321. When the input motor 330 provides driving power, the first gear 321 may rotate and drive the second gear 322 that meshes with the first gear 321 to rotate. The second gear 322 may drive the fixed rotation transmission member 310 to rotate. The fixed rotation transmission member 310 may further drive the rack 210 to move linearly. That is, in some embodiments, movement transmission from the input motor 330 to the fixed rotation transmission member 310 may be realized by gear transmission. In addition, the adaption manner, for example, may include another form such as worm gears, pulleys, or face gears.

In addition, in some other embodiments, the input motor 330 may directly drive the fixed rotation transmission member 310 to rotate. For example, the fixed rotation transmission member 310 may be coupled to the output shaft of the input motor 330.

Figure 5:
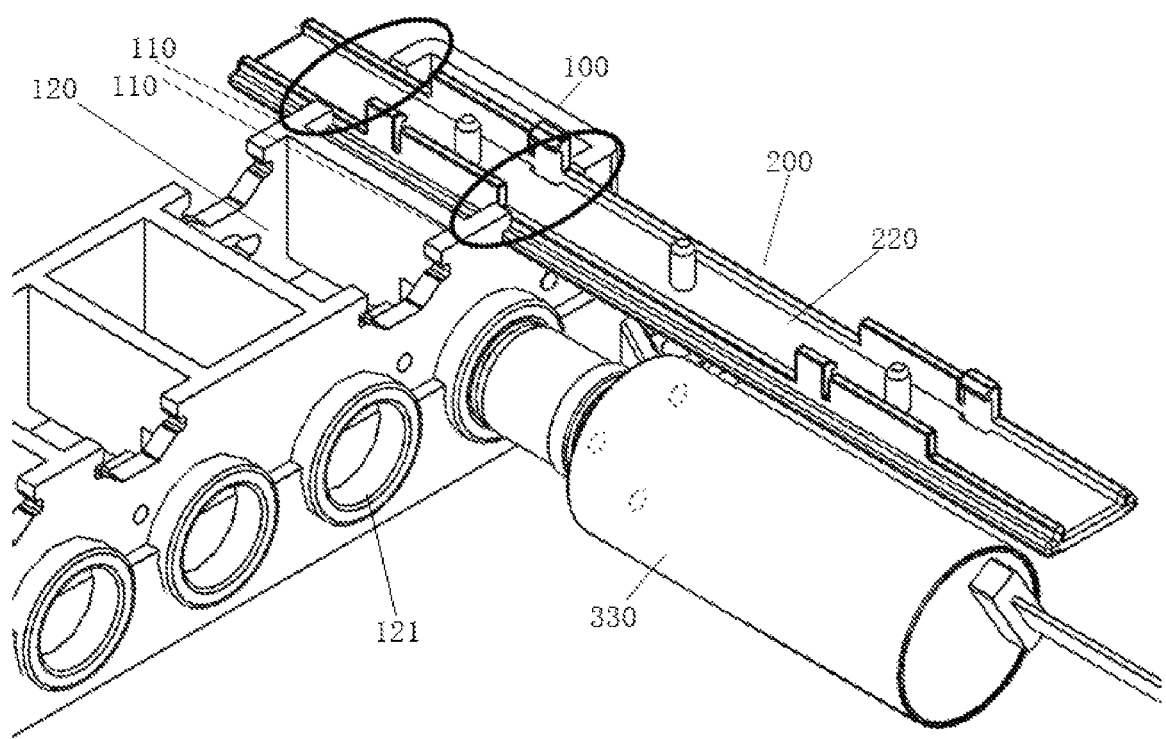
FIG. 5 is a second schematic partial diagram of the antenna transmission device according to some embodiments of the present disclosure.

As shown in FIG. 5, the shell 100 includes at least one snap slot 120 and at least one pair of sliding rails 110. A sidewall of the snap slot 120 includes a mounting hole 121. The input motor 330 is at least partially arranged in the mounting hole 121. The fixed rotation transmission member 310 and the adaptor assembly 320 are arranged in the snap slot 120 to limit the movement range of the input unit. The sliding rails 110 are arranged at the upper end of the snap slot 120. The corresponding output unit 200 is arranged at the upper end of the snap slot 120 to maintain a linear movement range of the output unit 200.

In some embodiments, as shown in FIG. 4, the fixed rotation transmission member 310, the first gear 321, and the second gear 322 are arranged in the snap slot 120, such that the fixed rotation transmission member 310 can only rotate in the snap slot 120, which limits other degrees of freedom of the fixed rotation transmission member 310. The sliding rails 110 allow the output unit 200 to only move along the sliding rails 110 and limit other degrees of freedom of the output unit 200. Therefore, the transmission precision of the disclosed transmission device may be increased.

As shown in FIG. 1 to FIG. 5, a size of the fixed rotation transmission member 310 is much smaller than a size of the output unit 200. A size of the sliding rail 110 is much smaller than the size of the output unit 200.

In some embodiments, for example, when a required transmission distance is 60 mm, a length of the transmission unit 200 is at least 60 mm, and a length of the shell 100 only needs to be 20-40 mm. In some other embodiments, when the required transmission distance is greater than 60 mm, the length of the output unit 200 may be at least the same as the transmission distance, and the length of the shell 100 may be still 20-40 mm.

As such, the shell of the antenna transmission device and the input unit may take a relatively small space. The antenna transmission device can provide output units of different dimensions according to the required transmission distance, that is, the antenna transmission device may have a more flexible application range.

As shown in FIG. 2 and FIG. 4, the fixed rotation transmission member 310 is a spiral transmission member having a first tooth profile. Two first stop surfaces 311 may be formed by cutting a start position and an end position of the spiral line of the first tooth profile, respectively. The rack 210 of the output unit 200 has a shape that accommodates the first tooth profile. Two second stop surfaces 211 disposed at two ends of the rack 210 respectively are configured to accommodate and fill gaps of the first tooth profile of the fixed rotation transmission member 310.

In some embodiments, the spiral transmission member 310 may include any one of a worm, a screw, or a ball screw. In some embodiments, the spiral transmission member 310 may include the worm. In some embodiments, when the worm drives the rack 210 to move linearly to an end of the rack 210, the first stop surface of the worm may cooperate with the corresponding second stop surface 211 to stop the worm and the rack 210 from moving.

As shown in FIG. 1 to FIG. 5, a specific operation principle of the antenna transmission device includes as follows.

The input motor 330 may be started to cause rotation output by the input motor 330 to be transferred to the fixed rotation transmission member 310 through the adaptor assembly 320. Then, rotation movement of the fixed rotation transmission member 310 may drive the rack 210 to move linearly. In some embodiments, the input motor 330 may be started to cause the input motor 330 to drive the first gear 321 to rotate. Since the first gear 321 meshes with the second gear 322, the first gear 321 may drive the second gear 322 to rotate. Since the second gear 322 is coupled to the fixed rotation transmission member 310, the second gear 322 may drive the fixed rotation transmission member 310 to rotate. Then, the fixed rotation transmission member 310 may drive the rack 210 to move linearly.

When the fixed rotation transmission member 310 drives the rack 210 to move linearly to an end of the rack 210, the first stop surface 311 of the fixed rotation transmission member 310 may cooperate with the corresponding second stop surface 211 of the rack 210 to stop the fixed rotation transmission member 310 and the rack 210 from moving.

The antenna transmission device of the present disclosure may realize a transmission manner of from rotation to translation by using the spiral transmission member 310 (e.g., one of a worm, a screw, or a ball screw) to cooperate with the rack 210. In addition, a rotation stop manner of cooperating the stop surfaces (e.g., the first stop surface 311 of the spiral transmission member 310 cooperating with the second stop surface 211 of the rack 210) may be used to limit the range of the transmission movement. Simultaneously, the sliding rail 110 may be arranged at the shell 100 to limit the transmission direction of the rack 210. On one hand, the antenna transmission device of the present disclosure may include fewer components with fewer types and reduce the manufacturing cost. The volume of the shell 100 may be reduced, which may provide a larger space for arranging the antenna. On another hand, the structure of the antenna transmission device of the present disclosure may realize a transmission movement mode by using a relatively short rotation member (e.g., the fixed rotation transmission member 310) to cooperate with a relatively long translational member (e.g., the rack 210) and realize the precise control of the transmission movement.

The above are merely some embodiments of the present disclosure, which are not used to limit embodiments of the present disclosure. For those skilled in the art, various modifications and changes may be made to embodiments of the present disclosure. Any modifications, equivalent replacements, and improvements made within the spirit and principle of embodiments of the present disclosure are within the scope of embodiments of the present disclosure.

Although embodiments of the present disclosure have been described with reference to several specific embodiments, embodiments of the present disclosure are not limited to the disclosed specific embodiments. Embodiments of the present disclosure are intended to cover various modifications and equivalent arrangements included within the spirit and scope of the appended claims. The scope of the appended claims is subjected to the broadest interpretation. Thus, the appended claims include all such modifications and equivalent structures and functions.

What is claimed is:

1. An antenna transmission device comprising:
a shell;
an output unit slidingly arranged at the shell and including a rack; and
an input unit partially arranged in the shell, meshing with the rack of the output unit, and configured to drive the output unit to move linearly,
wherein the shell includes:
a snap slot, the input unit being at least partially arranged in the snap slot to maintain a movement range of the input unit; and
a sliding rail arranged at an upper end of the snap slot, the output unit being arranged at the sliding rail to maintain a linear movement range of the output unit.

2. The transmission device of claim 1, wherein the input unit includes:
a fixed rotation transmission member arranged in the shell and meshing with the rack of the output unit; and
an input motor coupled to the fixed rotation transmission member and configured to drive the fixed rotation transmission member.

3. The transmission device of claim 2, wherein:
the fixed rotation transmission member includes a spiral transmission member having a first tooth profile; and
two corresponding first stop surfaces are formed by cutting a start position and a stop position of a spiral line of the first tooth profile, respectively.

4. The transmission device of claim 3, wherein:
the rack of the output unit includes a shape matching the first tooth profile; and
two corresponding second stop surfaces respectively disposed at two ends of the rack are configured to fill tooth gaps corresponding to the fixed rotation transmission member.

5. The transmission device of claim 4, wherein:
in response to the spiral transmission member driving the rack to move linearly to an end of the rack, one of the two corresponding first stop surfaces of the spiral transmission member cooperates with one of the two corresponding second stop surfaces of the rack to stop the spiral transmission member and the rack from moving.

6. The transmission device of claim 3, wherein the spiral transmission member includes a worm, a screw, or a ball screw.

7. The transmission device of claim 2, wherein the input unit further includes:
an adaptor assembly arranged in the shell, coupled to the fixed rotation transmission member to cause the input motor to be coupled to the fixed rotation transmission member through the adaptor assembly, the adaptor assembly including:
a first gear coupled to the input motor; and
a second gear coupled to the fixed rotation transmission member and meshing with the first gear;
wherein:
when being driven by the input motor, the first gear is configured to rotate and drive the second gear that meshes with the first gear to rotate and drive the fixed rotation transmission member to move.

8. The transmission device of claim 2, wherein a size of the fixed rotation transmission member is smaller than a size of the output unit.

9. The transmission device of claim 1, wherein the output unit further includes an assembly structure coupled to the rack.

* * * * *